US012757926B2

(12) United States Patent
Evans et al.

(10) Patent No.: US 12,757,926 B2
(45) Date of Patent: *Oct. 13, 2026

(54) TAMP-AND-STIR APPARATUS AND PROCESS THEREFOR

(71) Applicant: Altria Client Services LLC, Richmond, VA (US)

(72) Inventors: James D. Evans, Chesterfield, VA (US); Travis M. Garthaffner, Midlothian, VA (US); Herbert Cary Longest, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/975,031

(22) Filed: Dec. 10, 2024

(65) Prior Publication Data

US 2025/0098729 A1 Mar. 27, 2025

Related U.S. Application Data

(63) Continuation of application No. 18/442,421, filed on Feb. 15, 2024, now Pat. No. 12,193,475, which is a continuation of application No. 18/178,028, filed on Mar. 3, 2023, now Pat. No. 11,918,028, which is a continuation of application No. 16/825,292, filed on (Continued)

(51) Int. Cl.

*A24B 15/28* (2006.01)
*A24F 23/02* (2006.01)
*B65B 7/28* (2006.01)
*B65B 31/04* (2006.01)
*B65G 15/00* (2006.01)
*B65G 15/44* (2006.01)

(Continued)

(52) U.S. Cl.

CPC .............. *A24B 15/28* (2013.01); *A24F 23/02* (2013.01); *B65B 7/28* (2013.01); *B65B 31/04* (2013.01); *B65G 15/00* (2013.01); *B65G 15/44* (2013.01); *B65G 33/06* (2013.01); *B65G 37/00* (2013.01); *B65G 2201/0252* (2013.01); *B65G 2812/014* (2013.01)

(58) Field of Classification Search

CPC ........... A24B 15/28; A24F 23/02; B65B 7/28; B65B 31/04; B65G 15/00; B65G 15/44; B65G 33/06

See application file for complete search history.

(56) References Cited

U.S. PATENT DOCUMENTS

| | | | |
|---|---|---|---|
| 99,370 | A | 2/1870 | Sutton |
| 1,364,990 | A | 1/1921 | Gwinn |

(Continued)

FOREIGN PATENT DOCUMENTS

| | | | |
|---|---|---|---|
| WO | 2009/025604 | A1 | 2/2009 |

*Primary Examiner* — Lucas E. A. Palmer

(74) *Attorney, Agent, or Firm* — HARNESS, DICKEY & PIERCE, P.L.C.

(57) ABSTRACT

A machine and method for packaging tobacco sachets, comprising a plurality of linearly arranged, multi-functional, vertically moveable chambers having fluid sealing means on lower portions thereof, conveyor means disposed below the plurality of multi-functional, vertically moveable chambers, and a lidding apparatus disposed downstream of and in communication with the plurality of vertically moveable chambers through the conveyor means.

20 Claims, 2 Drawing Sheets

Related U.S. Application Data

Mar. 20, 2020, now Pat. No. 11,596,169, which is a continuation of application No. 15/218,900, filed on Jul. 25, 2016, now Pat. No. 10,609,950.

(60) Provisional application No. 62/196,140, filed on Jul. 23, 2015.

(51) Int. Cl.
*B65G 33/06* (2006.01)
*B65G 37/00* (2006.01)

(56) References Cited

U.S. PATENT DOCUMENTS

| | | | | |
|---|---|---|---|---|
| 2,759,307 | A | 8/1956 | Eolkin | |
| 3,357,155 | A * | 12/1967 | Carruthers | B65B 1/24 53/526 |
| 3,994,321 | A | 11/1976 | Eisenberg | |
| 4,509,568 | A * | 4/1985 | Kawaguchi | B65B 1/366 141/144 |
| 4,528,993 | A | 7/1985 | Sensabaugh, Jr. et al. | |
| 4,607,479 | A | 8/1986 | Linden | |
| 4,671,430 | A * | 6/1987 | Dinius | B65B 1/366 384/152 |
| 4,693,055 | A | 9/1987 | Olsen, Jr. et al. | |
| 4,703,765 | A * | 11/1987 | Paules | B65B 61/08 83/350 |
| 5,191,693 | A | 3/1993 | Umetsu | |
| 6,192,654 | B1 | 2/2001 | Georgitsis et al. | |
| 6,779,527 | B2 * | 8/2004 | Ehling | A24B 3/04 131/306 |
| 8,402,720 | B2 | 3/2013 | Boldrini et al. | |
| 8,602,068 | B2 * | 12/2013 | Williams | B65B 37/20 131/108 |
| 9,845,170 | B2 * | 12/2017 | Evans | B65B 29/00 |
| 10,609,950 | B1 * | 4/2020 | Evans | B65B 31/041 |
| 10,925,430 | B2 | 2/2021 | Bertash et al. | |
| 2010/0071711 | A1 * | 3/2010 | Boldrini | B65B 61/08 131/112 |
| 2012/0000165 | A1 * | 1/2012 | Williams | B65B 29/00 222/1 |
| 2012/0024301 | A1 | 2/2012 | Carroll et al. | |
| 2012/0055493 | A1 * | 3/2012 | Novak, III | B65B 9/213 131/111 |
| 2012/0125349 | A1 | 5/2012 | Hansson et al. | |
| 2012/0167902 | A1 | 7/2012 | Macko et al. | |
| 2012/0279178 | A1 * | 11/2012 | Griscik | B65B 63/00 53/111 R |
| 2015/0075671 | A1 | 3/2015 | Overbeck et al. | |
| 2017/0174375 | A1 | 6/2017 | Ek | |

* cited by examiner

TAMP-AND-STIR APPARATUS AND PROCESS THEREFOR

CROSS-REFERENCE TO RELATED APPLICATIONS

This patent application is a continuation application of application Ser. No. 18/442,421, filed Feb. 15, 2024, which is a continuation application of application Ser. No. 18/178,028, filed Mar. 3, 2023, which is a continuation application of application Ser. No. 16/825,292, filed Mar. 20, 2020, which is a continuation application of application Ser. No. 15/218,900, filed Jul. 25, 2016, which claims priority to U.S. Provisional Application Ser. No. 62/196,140, filed on Jul. 23, 2015, the entire contents of each of which are incorporated herein by reference.

FIELD

Disclosed herein are machines for processing pouched products in a container, such as tobacco sachets, and methods and systems for their finishing and packaging. More particularly, disclosed herein are apparatus, systems and methods of distributing moisture and staining the web of a plurality of tobacco sachets, followed by lidding the containers for the tobacco sachets.

Environment

Tobacco sachets or pouches offer an individual portion of tobacco that is to be placed under the upper lip for tobacco enjoyment. In the production of tobacco sachets, it is desirable that the web of the tobacco sachets be evenly colored and wetted when handled by the consumer. This uniform color and homogeneous moisture level in each individual package or can is an important characteristic of the product appearing fresh and new. Typically, tobacco sachets are loaded into cans which are individually and sequentially processed for distribution and sale at a high speed.

It would be desirable to provide an apparatus, system and method for finishing and packaging tobacco sachets at higher than conventional speeds.

However, some manufacturers of webs for forming the tobacco sachets add various processing and/or finishing materials to the web sheets which can interfere with wicking of moisture from tobacco sachets and thus result in uneven coloring of the sachets. Currently, when using such finished webs for forming sachets, a tobacco sachet manufacturer can only hope that the coloring of the web becomes uniform during shipping and/or storage, prior to the consumer purchasing the product.

Thus, it would likewise be desirable to provide a machine and a process for tamping and stirring tobacco sachets in a can, such that the sachets are evenly distributed in the can and provided with a uniform color throughout the surrounding webs thereof, prior to final packaging and shipping.

SUMMARY

Provided is a machine for packaging tobacco sachets, comprising a plurality of linearly arranged, multi-functional, vertically moveable chambers having fluid sealing means on lower portions thereof, conveyor means disposed below the plurality of multi-functional, vertically moveable chambers, and a lidding apparatus disposed downstream of and in communication with the plurality of vertically moveable chambers through the conveyor means.

In one form, each of the multi-functional, vertically moveable chambers comprises a compression head, a liquid spray nozzle, and a gas distribution nozzle.

In another form, the machine comprises from two to twelve of the multi-functional, vertically moveable chambers.

In yet another form, the fluid sealing means of the multi-functional, vertically moveable chambers are structured and arranged to fluidly seal top portions of tobacco sachet cans disposed on the conveyor means.

In still yet another form, the fluid sealing means comprises chamfered perimeters around the lower portion of the multi-functional, vertically moveable chambers.

In a further form, the conveyor means comprises a pair of spiral feed screws and a cleated belt.

Additionally provided is a process of packaging tobacco sachets, comprising providing a plurality of cans containing tobacco sachets on a conveyor means disposed below a plurality of linearly arranged, multi-functional, vertically moveable chambers having fluid sealing means on lower portions thereof, compressing said tobacco sachets into said cans with compression heads extending below said multi-functional, vertically moveable chambers and vertically withdrawing the compression heads, engaging the fluid sealing means with upper perimeters of the cans to seal the cans against fluid leakage, spraying water or a proprietary fluid onto the tobacco sachets, the water or proprietary fluid dispensed from liquid spray nozzles in the multi-functional, vertically moveable chambers, stirring the tobacco sachets with pressurized air dispensed from gas distribution nozzles in the multi-functional, vertically moveable chambers, disengaging the fluid sealing means from the upper perimeters of the cans, and moving the cans to a lidding apparatus disposed downstream of and in communication with the plurality of vertically moveable chambers through said conveyor means.

In one form, the process further comprises compressing the tobacco sachets in the cans with the compression heads after the stirring with air but before disengaging of the fluid sealing means.

In another form, from two to twelve cans containing tobacco sachets on the conveyor means are simultaneously disposed below a corresponding number of the linearly arranged, multi-functional, vertically moveable chambers.

In another form, the conveyor means comprises a pair of spiral feed screws feeding a cleated belt, and each the can is centered laterally on said belt and between the cleats.

Advantageously, the spiral screws are structured and arranged to separate the cans a distance corresponding to a distance between each of the plurality of linearly arranged, multi-functional, vertically moveable chambers.

BRIEF DESCRIPTION OF THE DRAWINGS

The forms disclosed herein are illustrated by way of example, and not by way of limitation, in the figures of the accompanying drawings and in which like reference numerals refer to similar elements and in which.

DETAILED DESCRIPTION

Figure 1:
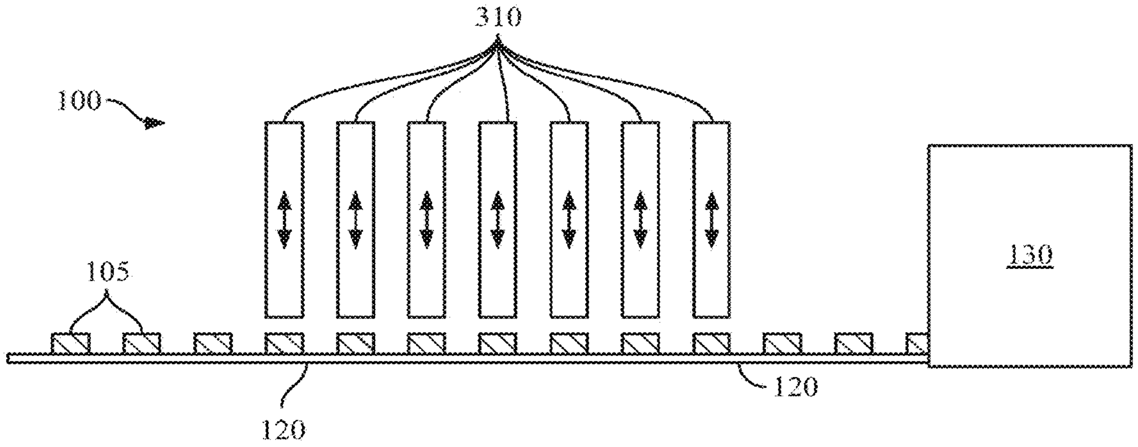
FIG. 1 presents an overall plan side view of the combined apparatuses, as disclosed herein.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-3E, wherein like numerals are used to designate like elements throughout.

In general, structures and/or features that are, or are likely to be, included in a given form are indicated in solid lines in the figures, while optional structures and/or features are indicated in broken lines. However, a given form is not required to include all structures and/or features that are illustrated in solid lines therein, and any suitable number of such structures and/or features may be omitted from a given form without departing from the scope of the present disclosure.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," ""having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

As discussed above, it is desirable to rapidly produce cans of tobacco sachets having a uniform color throughout the surrounding webs thereof and uniform moisture distribution throughout the tobacco therein, prior to final packaging and shipping.

Disclosed herein is a machine and process that enable high speed processing and packaging of tobacco sachets or pouches. The process begins with a series of cans full of sachets being conveyed, single file, to a pair of spiral feed screws that have a separation area in the first 8 to 10 inches. In this area cans are separated from touching each other to provide a distance of about 4 inches between each can and introduced to a cleated belt, by which the cans progress through the machine. The separation distance between the cans corresponds to the distance between each of a plurality of, such as from two to twelve, linearly-arranged, multi-functional, vertically moveable chambers in a tamp-and-stir apparatus under which an equivalent number of cans are stopped. The cans are then clamped against a set of centering guides which insures proper alignment under the chambers.

In one form the conveyor means comprises an essentially continuous cleated belt, which inverts itself on rollers at either end of the apparatus. The cleats on the belt help to push the cans through the apparatus. The conveyor means can further comprise a separation device, such as a pair of spiral feed screws, which separates the cans a suitable distance for deposition onto the cleated belt and introduction into the tamp-and-stir apparatus.

Once the cans are in position under the vertically moveable chambers, compression heads in the form of moveable pistons, having diameters slightly less than those of the cans, extend vertically down through the chambers and make contact with the pouches, "tamping" them into the cans for further processing, to avoid pouches overlapping the can edges. In one form, the compression heads can be servo-motor driven. After the sachets are tamped securely in the cans, the pistons are vertically retracted into the chambers.

The vertical chambers, which are likewise vertically moveable, are lowered into fluid sealing contact with each of the cans. The seal can be provided by, for example, a chamfered lower circumferential edge of the vertical chambers, which are generally cylindrical. However, other fluid sealing means could be incorporated between the vertical chambers and the cans. The chamfered edge is urged into contact with the lips of the cans. This creates an air/water tight seal between the vertical chambers and the cans.

At this point, from about 4 to 8 grams of water or a proprietary fluid are sprayed into the cans and onto the sachets, such as through apertures in the pistons or through hydraulic injectors mounted in the side walls of the chambers. The chambers are then pneumatically pressurized, such as to about 30 to 35 psig, to force air through nozzles or apertures within the compression heads which are directed toward the pouches, thus pneumatically "stirring" them.

Subsequently, the sachets are again tamped into the cans by the compression heads, the centering guide clamps are retracted, and the plurality of processed cans are moved downstream by the conveyor means to a lidding apparatus, where lids are placed and secured on each can. This "tamp-and-stir" process helps to ensure that the sachets and the contents thereof are evenly exposed to water or the proprietary fluid, so as to provide both moisture to the tobacco contained in the sachets and satisfying coloring to the fabric of the pouches, and can be repeated as needed.

As will be understood from the description above, the vertical chambers are multi-functional by virtue of having the ability to not only tamp the tobacco sachets in the cans, but also to wet and stir them. The vertical chambers can also be supplied with a source of pressurized cleaning air to remove excess fluid or debris from the chambers when necessary.

Subsequent to the tamp-and-stir process, the conveyor means conveys the filled cans to a lidding apparatus, where a series of formed lids are securely deposited on top of the cans.

FIG. 1 is an overall plan side view of the combined apparatuses, as disclosed herein. The tamp-and-stir apparatus 100 comprises a conveyor means including a cleated belt 120, which extends beneath a plurality of multi-functional, vertically moveable chambers 310. Carried on the belt is a series of open cans 105 containing tobacco sachets to be processed. The series of cans 105 are moved into a centered-alignment below the chambers 310 and the cleated belt 120 is stopped. Subsequent to processing by the multi-functional chambers, which will be described in more detail below, the open cans progress along cleated belt 120, out of alignment with the vertical chambers 310 and into a lidding apparatus 130, such as provided by Del Packaging, Ltd. of Cypress, TX, wherein lids for the tobacco sachet cans are applied and compressed onto the cans.

Figure 2:
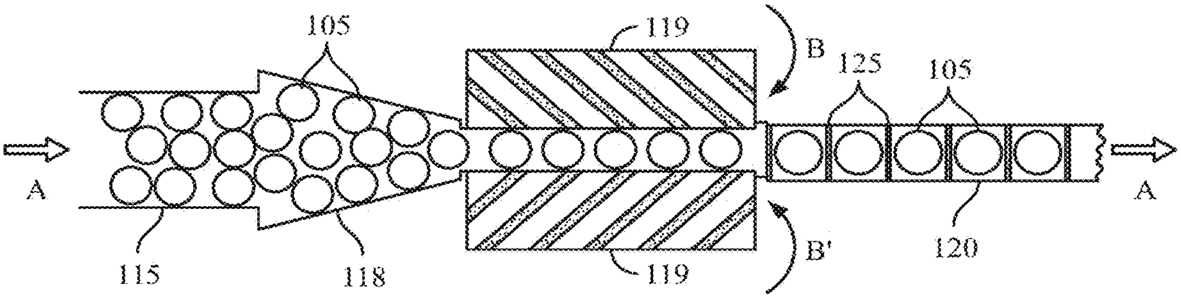
FIG. 2 presents an overhead schematic view of a first conveyor means, as disclosed herein.

FIG. 2 is an overhead schematic of the upstream, feed side of the apparatus, wherein filled cans 105 moving generally in direction of path A are fed via a belt or other suitable conveyor 115 into a feed chute 118, which constricts the travel path of the cans to single-file. The cans are then delivered single-file into commercially available parallel spiral feed screws 119, which counter-rotate generally in the directions B and B', such that the spiral paths in the feed screws catch the cans and distribute them at suitable distances along path A to conform to the spacing between individual multi-functional chambers 310, such as about 4 inches apart. Spaced cans 105 are then deposited between cleats 125 onto cleated belt 120 for conveyance into the tamp-and-stir apparatus and below chambers 310.

FIGS. 3A through 3E present illustrations of the details and workings of the tamp-and-stir apparatus chambers.

Figures 3A, 3B, 3C, 3D, 3E:
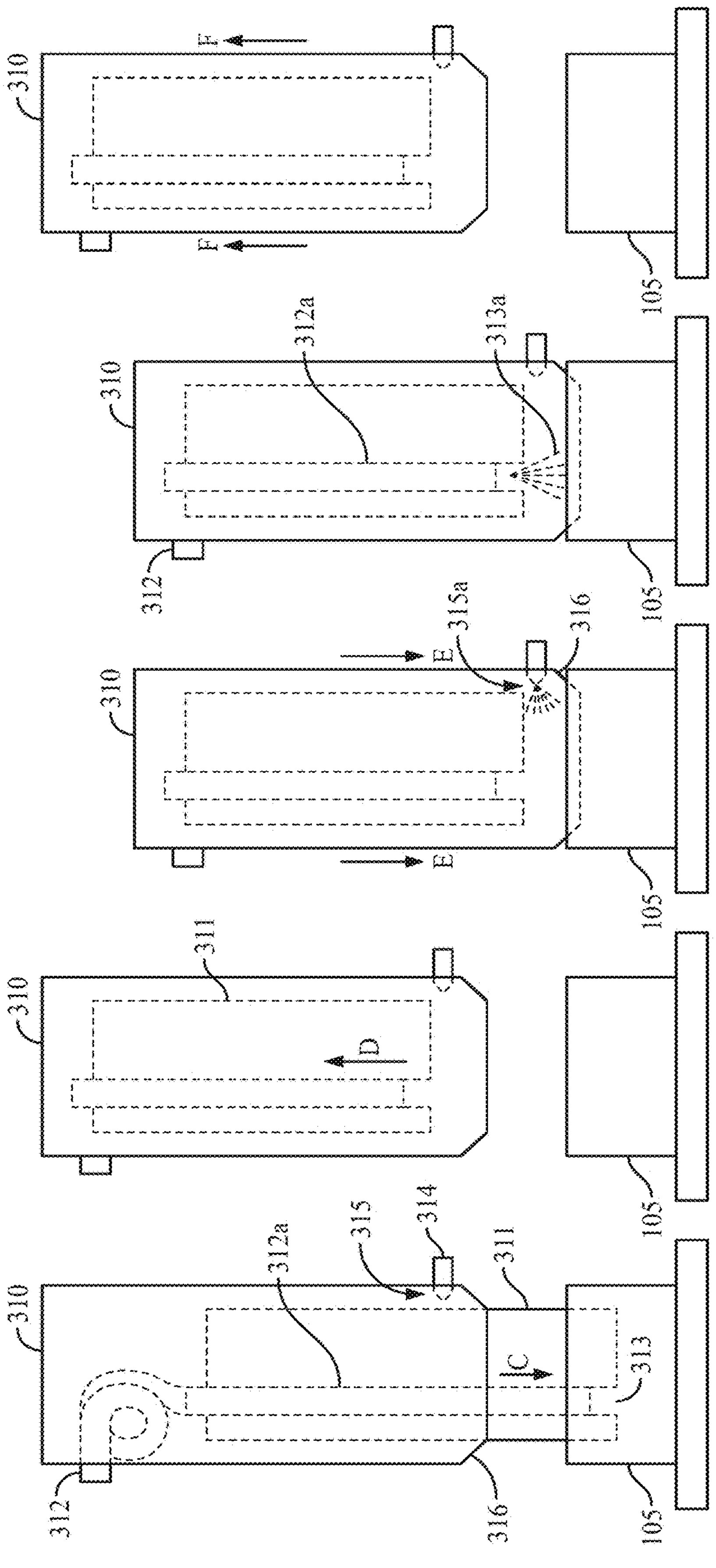
FIGS. 3A through 3E present illustrations of the details and workings of the tamp-and-stir apparatus chambers, as disclosed herein.

In FIG. 3A, vertical chamber 310 is in its upper position, centered over can 105, while the compression head in the form of a vertically-acting piston 311 is shown extended downward in the direction of arrow C into contact with tobacco sachets (not shown) within can 105, so as to tamp the sachets securely within the walls of the can before further processing. Chamber 310 has a compressed air inlet 312, connected with flexible tubing (shown in phantom) to a pipe or passage 312*a* (also in phantom) extending internally through piston 311 to stirring air exit aperture 313 at the bottom of piston 311. Chamber 310 is also provided with pressurized water or a proprietary fluid from an external source (not shown) which enters inlet 314, passes through the wall of chamber 310 and into a spray nozzle 315. Chamber 310 terminates at its lower end in a chamfered lower circumferential edge 316 structured and arranged for sealing against the upper lip portion of can 105. Those skilled in the art will recognize that variations in the locations of stirring air exit aperture 313 and spray nozzle 315, as well as the manner and locations for connecting these to outside sources of air and water or proprietary fluid are readily apparent, and as such are not considered to be outside the scope of the present disclosure. For example, the locations of apertures 313 and 315 could be reversed, or each could be located at the lower terminus of piston 311, or both could even be combined into a single aperture with appropriate valving and timing for the respective fluids.

Subsequently, as depicted in FIG. 3B, piston 311 is withdrawn vertically in the direction of arrow D into the chamber, and chamber 310 moves vertically downward in the direction of arrows E (FIG. 3C), such that chamfered lower circumferential edge 316 is gently urged into fluid sealing contact with the upper circumferential edge/lip of can 105. In this illustration sealing edge 316 lowers into can 105, but could also be configured to have an opposite chamfer, such that sealing edge 316 would extend over and outside of the top of can 105. In any case, a suitable fluid seal is established between multi-functional, vertically moveable chamber 310 and tobacco sachet can 105, after which water or a proprietary fluid spray 315*a* is directed over the tobacco sachets within the can.

FIG. 3D illustrates the air stirring method effected by chamber 310, wherein after wetting, compressed air from an external source (not shown) enters the chamber at fitting 312, is directed through pipe/passage 312*a* internally down through piston 311 and is forced out of stirring air exit aperture 313 as a stream of pressurized air 313*a*, which impinges upon the wet tobacco sachets and randomly forces them away from the bottom of can 105 and away from each other for a short period of time. The seal created by lower circumferential edge 316 and the upper lip of can 105 prevents the sachets from being blown horizontally out of the can.

Subsequently, as depicted in FIG. 3E, chamber 310 is vertically withdrawn from can 105 in the direction of arrows F, at which time the conveyor 120 is restarted and the plurality of cans are moved into the lidding apparatus 130 (FIG. 1).

Another advantage of the presently disclosed machine is that due to its linear arrangement, two similar or identical machines can be positioned side-by-side to double the output as compared to a single machine, when run simultaneously. In this configuration, the output from both tamp-and-stir apparatuses can be fed to a single lidding apparatus, if desired. Alternatively, one machine can be serviced while the other continues processing the products.

The forms disclosed herein, as illustratively described and exemplified hereinabove, have several beneficial and advantageous aspects, characteristics, and features. The forms disclosed herein successfully address and overcome shortcomings and limitations, and widen the scope, of currently known teachings with respect to pouch production.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one form, to A only (optionally including entities other than B); in another form, to B only (optionally including entities other than A); in yet another form, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one form, to at least one, optionally including more than one, A, with no B present (and optionally including entities other than B); in another form, to at least one, optionally including more than one, B, with no A present (and optionally including entities other than A); in yet another form, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

It is within the scope of the present disclosure that an individual step of a method recited herein may additionally or alternatively be referred to as a "step for" performing the recited action.

Illustrative, non-exclusive examples of apparatus, systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

PCT1. A machine for packaging tobacco sachets, comprising a plurality of linearly arranged, multi-functional, vertically moveable chambers having fluid sealing means on lower portions thereof, conveyor means disposed below said plurality of multi-functional, vertically moveable chambers, and a lidding apparatus disposed downstream of and in communication with said plurality of vertically moveable chambers through said conveyor means.

PCT2. The machine of paragraph PCT1, wherein each said multi-functional, vertically moveable chamber comprises a compression head, a liquid spray nozzle, and a gas distribution nozzle.

PCT3. The machine of paragraph PCT1 or PCT2, comprising from two to twelve of said multi-functional, vertically moveable chambers.

PCT4. The machine of any of paragraphs PCT1 to PCT3, wherein the fluid sealing means of said multi-functional, vertically moveable chambers are structured and arranged to fluidly seal top portions of tobacco sachet cans disposed on said conveyor means.

PCT5. The machine of any of paragraphs PCT1 to PCT4, wherein the fluid sealing means comprises chamfered perimeters around the lower portion of said multi-functional, vertically moveable chambers.

PCT6. The machine of any of paragraphs PCT1 to PCT5, wherein said conveyor means comprises a pair of spiral feed screws and a cleated belt.

PCT7. A process of packaging tobacco sachets, comprising providing a plurality of cans containing tobacco sachets on a conveyor means disposed below a plurality of linearly arranged, multi-functional, vertically moveable chambers having fluid sealing means on lower portions thereof, compressing said tobacco sachets into said cans with compression heads extending below said multi-functional, vertically moveable chambers and vertically withdrawing the compression heads, engaging said fluid sealing means with upper perimeters of said cans to seal said cans against fluid leakage, spraying water or a proprietary fluid onto said tobacco sachets, said water or proprietary fluid dispensed from liquid spray nozzles in said multi-functional, vertically moveable chambers, stirring said tobacco sachets with pressurized air dispensed from gas distribution nozzles in said multi-functional, vertically moveable chambers, disengaging said fluid sealing means from said upper perimeters of said cans, and moving said cans to a lidding apparatus disposed downstream of and in communication with said plurality of vertically moveable chambers through said conveyor means.

PCT8. The process of paragraph PCT7, further comprising compressing said tobacco sachets in said cans with said compression heads after said stirring with air but before disengaging of said fluid sealing means.

PCT9. The process of paragraph PCT7 or PCT8, wherein from two to twelve cans containing tobacco sachets on said conveyor means are simultaneously disposed below a corresponding number of said linearly arranged, multi-functional, vertically moveable chambers.

PCT10. The process of any of paragraphs PCT7 to PCT9, wherein said conveyor means comprises a pair of spiral feed screws feeding a cleated belt and each said can is centered laterally on said belt and between the cleats.

PCT11. The process of paragraph PCT10, wherein said spiral screws are structured and arranged to separate the cans a distance corresponding to a distance between each of the plurality of linearly arranged, multi-functional, vertically moveable chambers.

While the present disclosure has been described and illustrated by reference to particular forms, those of ordinary skill in the art will appreciate that the present disclosure lends itself to variations not necessarily illustrated herein.

For this reason, then, reference should be made solely to the appended claims for purposes of determining the true scope of the present disclosure.

What is claimed:

1. A tamp and stir machine for processing a plurality of sachets in a package, the tamp and stir machine comprising:

a chamber vertically movable from a first chamber position to a second chamber position;

a piston vertically movable within the chamber from a first piston position within the chamber to a second piston position; and a stirring air aperture defined by a side wall of the chamber.

2. The tamp and stir machine of claim 1, wherein the stirring air aperture is connected to both a liquid source and an air source, and the stirring air aperture is configured to spray a liquid and distribute compressed air.

3. The tamp and stir machine of claim 1, further comprising:

a fluid seal on a lower portion of the chamber.

4. The tamp and stir machine of claim 1, wherein the chamber includes a lower edge, the lower edge including a chamfered circumferential edge so as to provide a fluid seal when engaged with a circumferential edge of the package.

5. The tamp and stir machine of claim 1, wherein at least a portion of the piston protrudes from the chamber when the chamber is in the first chamber position.

6. The tamp and stir machine of claim 1, wherein the piston includes a compression head on a lower face of the piston, the compression head configured to engage the plurality of sachets in the package.

7. The tamp and stir machine of claim 1, wherein the stirring air aperture includes a gas distribution nozzle.

8. The tamp and stir machine of claim 7, wherein the gas distribution nozzle is connected to a compressed air source.

9. The tamp and stir machine of claim 1, wherein the chamber includes a lower edge, the lower edge including a chamfered circumferential edge so as to provide a fluid seal when engaged with a circumferential edge of the package.

10. The tamp and stir machine of claim 1, wherein the plurality of sachets are tobacco sachets.

11. The tamp and stir machine of claim 1, further comprising:

a conveyor below the chamber.

12. The tamp and stir machine of claim 11, wherein the conveyor includes a pair of spiral feed screws.

13. The tamp and stir machine of claim 11, wherein the conveyor includes a cleated belt.

14. The tamp and stir machine of claim 1, wherein the chamber includes a plurality of chambers, and each chamber of the plurality of chambers includes a respective piston and a respective stirring air aperture.

15. A method of processing a plurality of sachets in a package, the method comprising:

compressing the plurality of sachets by moving a piston from a first vertical position to a second vertical position protruding from a chamber, the piston being movable independent of the chamber;

returning the piston from the second vertical position to the first vertical position within the chamber; and spraying a fluid into the plurality of sachets with a liquid spray nozzle within the chamber.

16. The method of claim 15, further comprising:

engaging a fluid seal of the chamber with an upper perimeter of the package to seal the package against fluid leakage.

17. The method of claim 16, wherein the engaging the fluid seal of the chamber includes moving the chamber from a first chamber position to a second chamber position.

18. The method of claim 15, wherein the spraying the fluid onto the plurality of sachets includes moving the chamber from a first chamber position to a second chamber position.

19. The method of claim 18, wherein the moving the chamber from the first chamber position to the second chamber position includes holding the piston in the first piston position.

20. The method of claim 15, further comprising:

moving the package on a conveyor to align with the chamber.

* * * * *